United States Patent
Ge et al.

(10) Patent No.: US 9,838,013 B2
(45) Date of Patent: Dec. 5, 2017

(54) INTEGRATED CIRCUIT WITH MULTI-BIT CLOCK GATING CELLS

(71) Applicant: NXP USA, Inc., Austin, TX (US)

(72) Inventors: Zhe Ge, Suzhou (CN); Huabin Du, Suzhou (CN); Miaolin Tan, Suzhou (CN); Peidong Wang, Suzhou (CN)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 15/356,626

(22) Filed: Nov. 20, 2016

(65) Prior Publication Data
US 2017/0302277 A1 Oct. 19, 2017

(30) Foreign Application Priority Data
Apr. 14, 2016 (CN) .......................... 2016 1 0230326

(51) Int. Cl.
*H03K 19/00* (2006.01)
*G06F 17/50* (2006.01)
*H03K 19/21* (2006.01)
*G06F 1/06* (2006.01)
*G06F 1/32* (2006.01)

(52) U.S. Cl.
CPC .......... *H03K 19/0016* (2013.01); *G06F 1/06* (2013.01); *G06F 1/32* (2013.01); *G06F 17/5072* (2013.01); *H03K 19/21* (2013.01); *G06F 2217/62* (2013.01); *G06F 2217/78* (2013.01)

(58) Field of Classification Search
None
See application file for complete search history.

(56) References Cited

U.S. PATENT DOCUMENTS

| | | | | |
|---|---|---|---|---|
| 5,883,529 A * | 3/1999 | Kumata | ................... | G06F 1/06 326/83 |
| 5,987,614 A * | 11/1999 | Mitchell | ............... | G06F 1/3203 710/16 |
| 6,300,809 B1 * | 10/2001 | Gregor | ................... | H03K 3/012 327/200 |
| 6,321,366 B1 * | 11/2001 | Tseng | .................. | G06F 17/5022 326/94 |
| 7,562,325 B1 | 7/2009 | Arbel et al. | | |
| 7,925,465 B2 * | 4/2011 | Lin | .................. | G01R 31/31857 702/124 |
| 8,225,245 B2 | 7/2012 | Oommen et al. | | |
| 8,572,418 B2 | 10/2013 | Singasani | | |

(Continued)

*Primary Examiner* — Crystal L Hammond
(74) *Attorney, Agent, or Firm* — Charles E. Bergere (57) ABSTRACT

A multi-bit clock gating cell is used in an integrated circuit (IC) in place of single bit clock gating cells to reduce power consumption. A physical design method is used to form a clock tree of the IC. Initial positions of clock gating cells are defined with respective initial clock input paths. Selected clock gating cells are moved to modified positions in which they may be adjoining. Adjoining cells are merged by substituting a multi-bit clock gating cell having multiple gating signal inputs, corresponding gated clock outputs, and a common clock input path. A net reduction is obtained for the overall capacitance of the clock path due to reduction of the upstream capacitance of the clock path and of the resulting multi-bit clock gating cell itself, compared with the aggregate capacitance of the clock paths of the corresponding clock gating cells before moving and merging.

6 Claims, 9 Drawing Sheets

(56) References Cited

U.S. PATENT DOCUMENTS

| | | | |
|---|---|---|---|
| 9,135,375 B1* | 9/2015 | Sood | G06F 17/50 |
| 9,391,614 B2* | 7/2016 | Paterson | H03K 19/0016 |
| 9,547,028 B2* | 1/2017 | Priel | G06F 1/10 |
| 9,571,341 B1* | 2/2017 | Kumar | H04L 45/08 |
| 2007/0174514 A1* | 7/2007 | Lee | G06F 1/3203 |
| | | | 710/52 |
| 2008/0189563 A1* | 8/2008 | Itkin | G06F 1/3203 |
| | | | 713/300 |
| 2008/0301594 A1 | 12/2008 | Jiang et al. | |
| 2008/0303576 A1* | 12/2008 | Chueh | G06F 1/10 |
| | | | 327/299 |
| 2009/0267649 A1 | 10/2009 | Saint-Laurent et al. | |
| 2010/0321063 A1* | 12/2010 | Ferchland | H03K 19/21 |
| | | | 326/52 |
| 2012/0139590 A1* | 6/2012 | Myers | G06F 1/10 |
| | | | 327/113 |
| 2013/0173951 A1* | 7/2013 | Vogel | G06F 1/10 |
| | | | 713/600 |
| 2013/0194016 A1* | 8/2013 | Wimer | H03K 19/0016 |
| | | | 327/199 |
| 2015/0326225 A1* | 11/2015 | Kato | H03K 3/012 |
| | | | 326/83 |
| 2016/0328507 A1* | 11/2016 | Millar | G06F 17/5045 |

\* cited by examiner

INTEGRATED CIRCUIT WITH MULTI-BIT CLOCK GATING CELLS

BACKGROUND

The present invention is directed to integrated circuits and, more particularly, to using multi-bit clock gating cells to reduce power consumption by an integrated circuit.

Power consumption is critical in large integrated circuits (ICs) such as systems on chips (SOCs), which may have many million transistors. A widely used technique for reducing dynamic power consumption is to use clock gating cells to switch off the clock to portions of the IC while they are not required to operate. However, the clock gating cells themselves consume significant power and add to the complexity of the IC.

It would be advantageous to have a way of reducing the power consumption and complexity of the clock tree of an integrated circuit.

BRIEF DESCRIPTION OF THE DRAWINGS

The present invention, together with objects and advantages thereof, may best be understood by reference to the following description of embodiments thereof shown in the accompanying drawings. Elements in the drawings are illustrated for simplicity and clarity and have not necessarily been drawn to scale.

DETAILED DESCRIPTION

Figure 1:
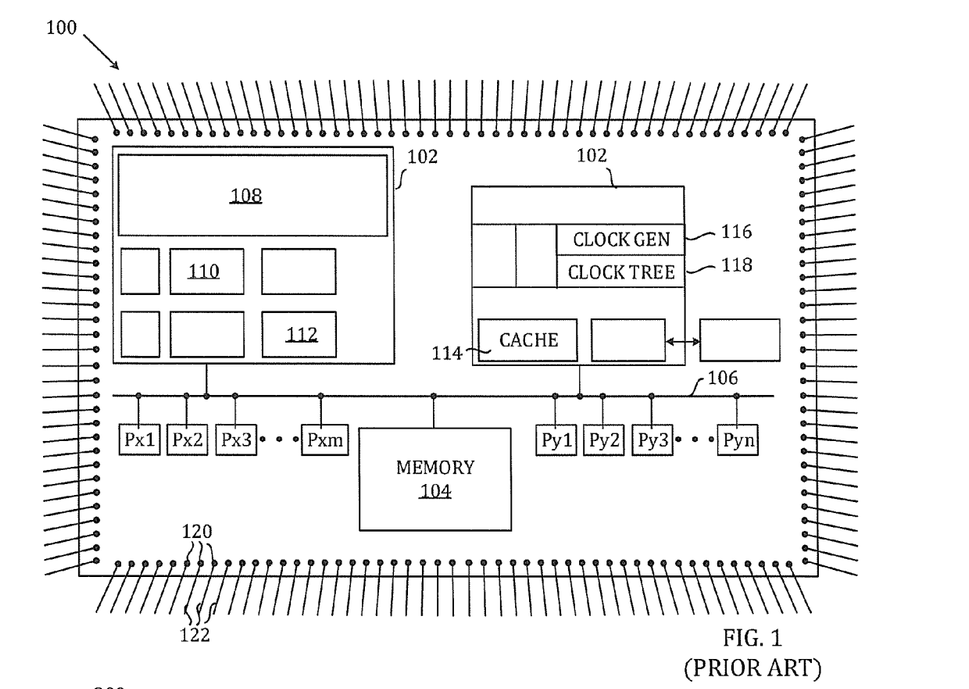
FIG. 1 is a schematic block diagram of a conventional integrated circuit (IC)

FIG. 1 illustrates an example of a conventional integrated circuit (IC) 100 that may be designed and fabricated using a method including a method of physical design in accordance with the present invention, although as will be apparent to those of skill in the art, using the method of the present invention (described in detail below), modifies the conventional design. The IC 100 has one or more processor cores 102 connected with memory 104 through core interconnects including a bus 106. The IC 100 includes an instruction unit 108, an execution unit 110, and an arithmetic logic unit 112, caches 114, among other modules (not shown specifically). The IC 100 also has at least one clock generator 116 and at least one clock tree 118 distributing an input clock signal to clocked elements of the IC 100 such as registers and flip-flops. Bond pads 120 are connected to input/output (I/O) pins (not shown) with bond wires 122. The IC 100 also includes peripherals Px1 to Pxm and Py1 to Pyn. The peripherals may include modules whose function may be communication, power management or built-in self-test (BIST) for example. It will be understood that the IC 100 is just an example of an IC that may be designed in accordance with the method described below, and other types of IC may be designed using the present invention, such as SOCs and ASICs, and the invention is not limited to a particular assembly process like wire bonding.

Figure 2:
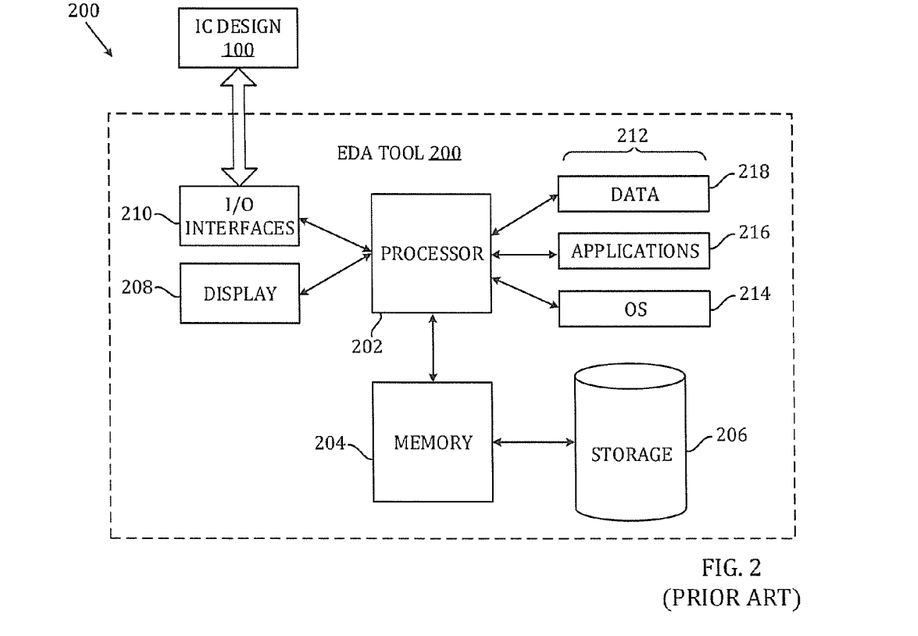
FIG. 2 is a schematic block diagram of an exemplary electronic design automation (EDA) tool for performing the methods of the present invention of physical design of an IC such as the IC of FIG. 1.

FIG. 2 is a schematic block diagram of a conventional electronic design automation (EDA) tool 200 that may be used in an embodiment of the present invention in performing a method of design of an IC, such as the IC 100. The EDA tool 200 includes a processor 202 coupled to a memory 204 and additional memory or storage 206 coupled to the memory 204. The EDA tool 200 also includes a display device 208, input/output interfaces 210, and software 212. The software 212 includes operating system software 214, applications programs 216, and data 218. The applications programs 216 can include, among other things, commercially available modules for use in architectural design, functional and logic design, circuit design, physical design, and verification. The data 218 can include an architectural design, a functional and logic design, a circuit design, a physical design, a modified or corrected physical design, and a library of standard cells and other components, with variants having different characteristics. The EDA tool 200 generally is known in the art except for the software used to implement the method of physical design of the IC. When software or a program is executing on the processor 202, the processor becomes a "means-for" performing the steps or instructions of the software or application code running on the processor 202. That is, for different instructions and different data associated with the instructions, the internal circuitry of the processor 202 takes on different states due to different register values, and so on, as is known by those of skill in the art. Thus, any means-for structures described herein relate to the processor 202 as it performs the steps of the methods disclosed herein.

Figure 3:
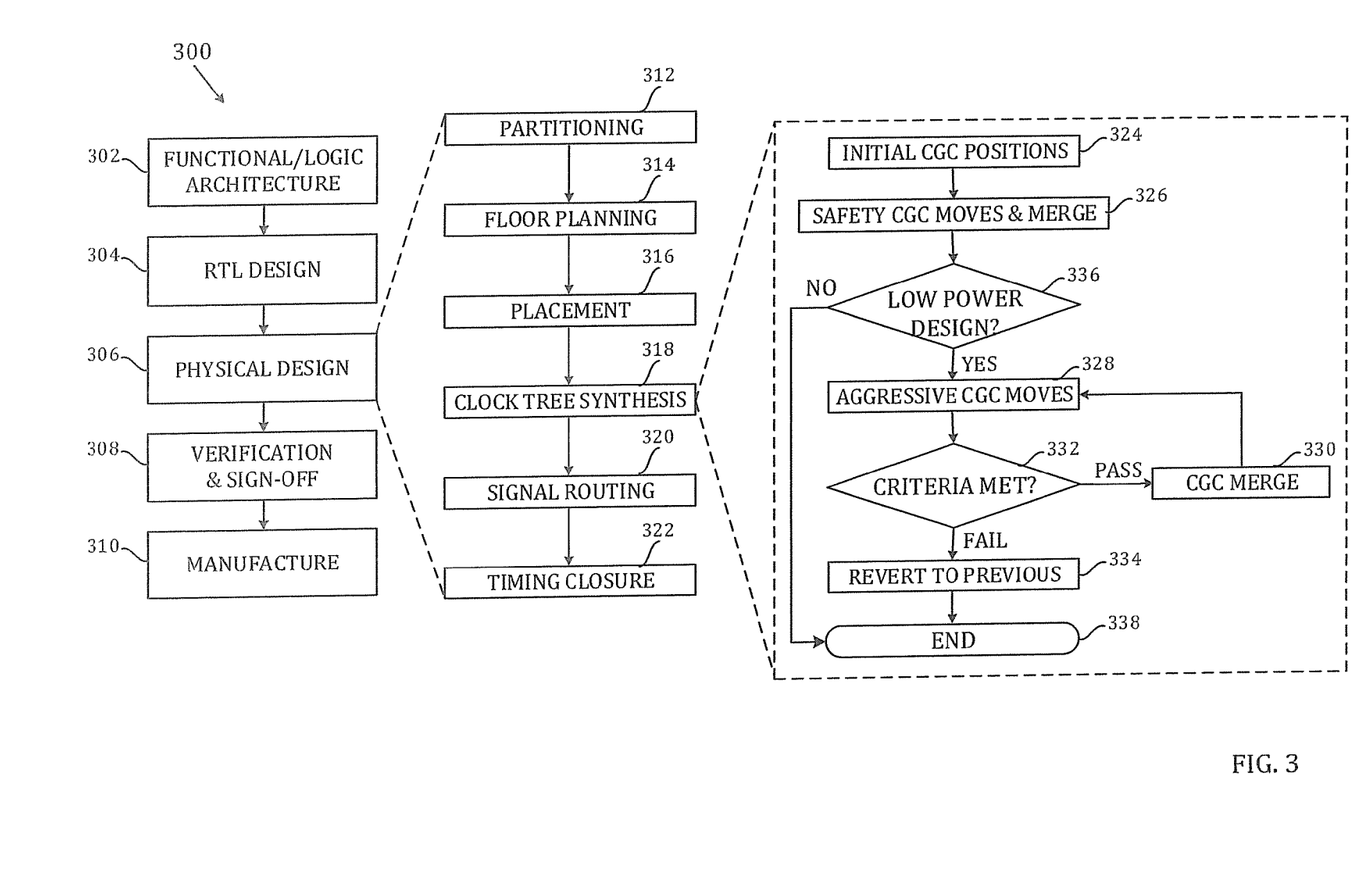
FIG. 3 is a flow chart of a method of physical design of an IC such as the IC of FIG. 1 in accordance with an embodiment of the invention.

FIG. 3 illustrates a method 300 in accordance with an embodiment of the invention of physical design of an IC such as the IC 100 using an EDA tool such as the EDA tool 200 with additional software for performing the below-described method. The method 300 comprises defining 302 a functional and logic architecture in a hardware description language (HDL), deriving 304 a register transfer level (RTL) design, elaborating 306 a physical design, verification and sign-off 308 of the physical design, and manufacture or fabrication 310 of the IC. The elaborating 306 of a physical design may include partitioning 312 the RTL design into groups such as logic groups, clock groups, and power rings and straps, floor planning 314, placement 316 of the logic and registers and associated elements, clock tree synthesis 318 that may include buffer addition, sizing and optimization, signal routing 320 and timing closure 322.

Figure 4:
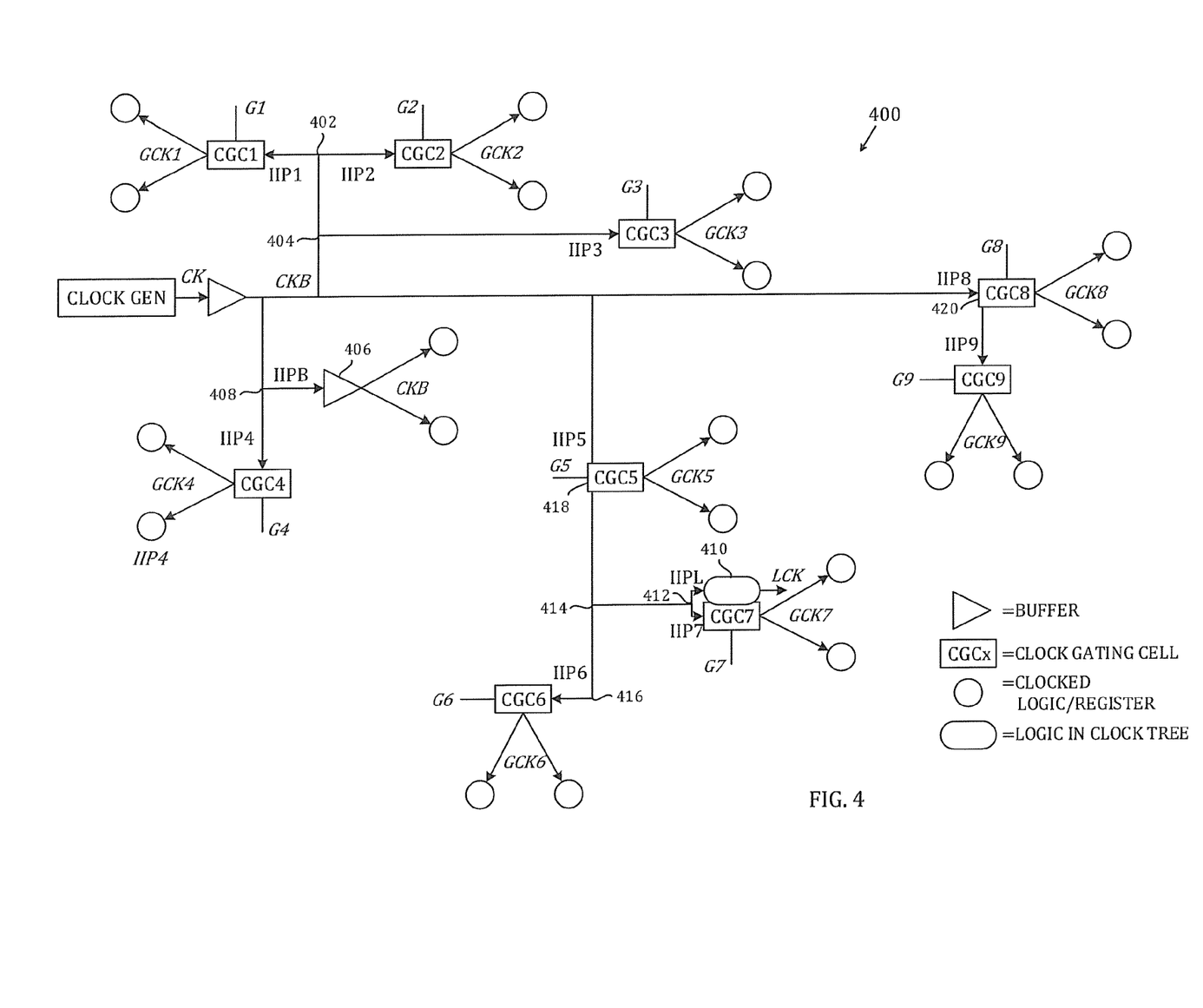
FIGS. 4 to 8 are schematic representations of elements of the IC in initial positions and subsequent modified positions defined by iterations in the method of FIG. 3.
Figure 5:
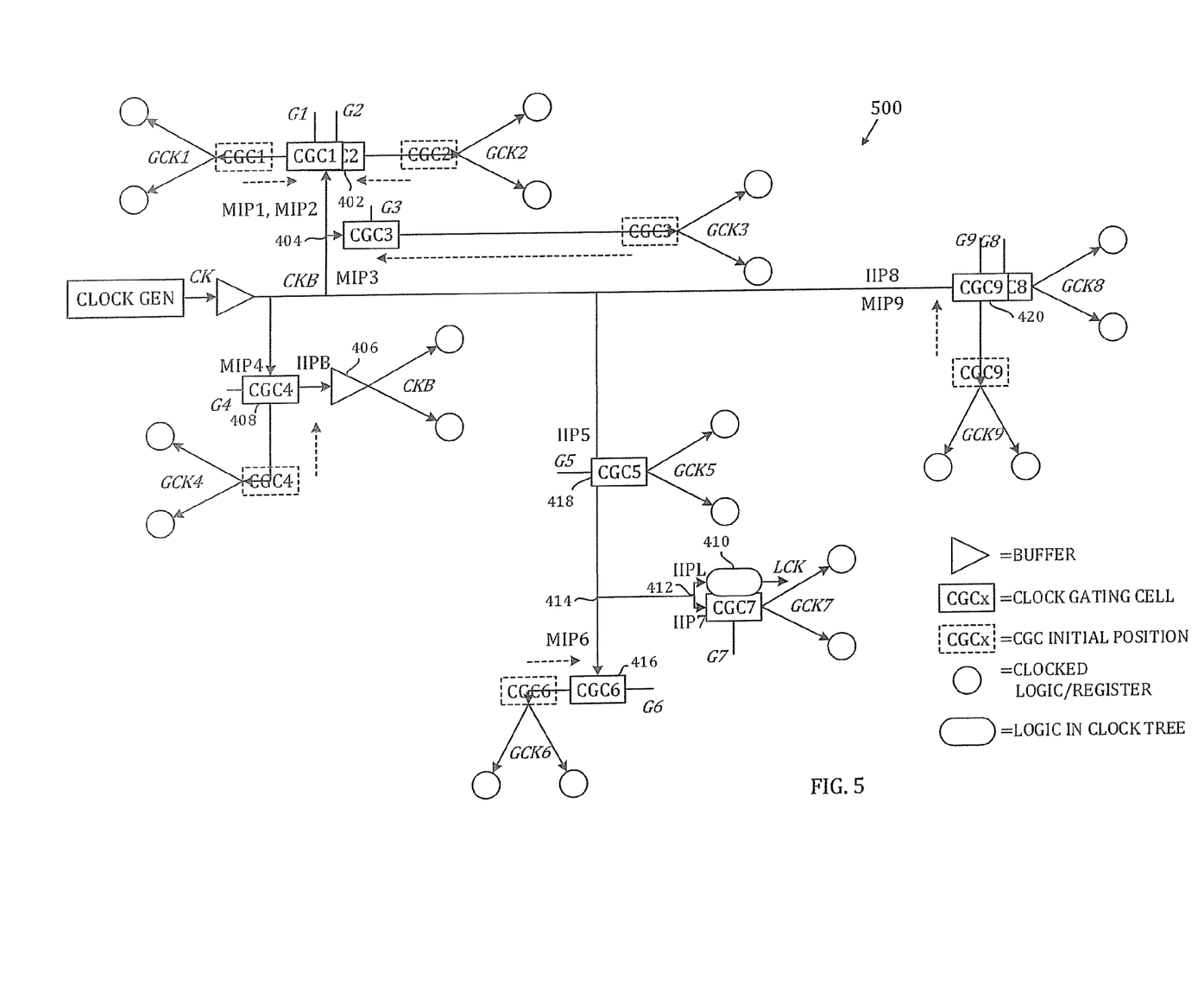
Figure 6:
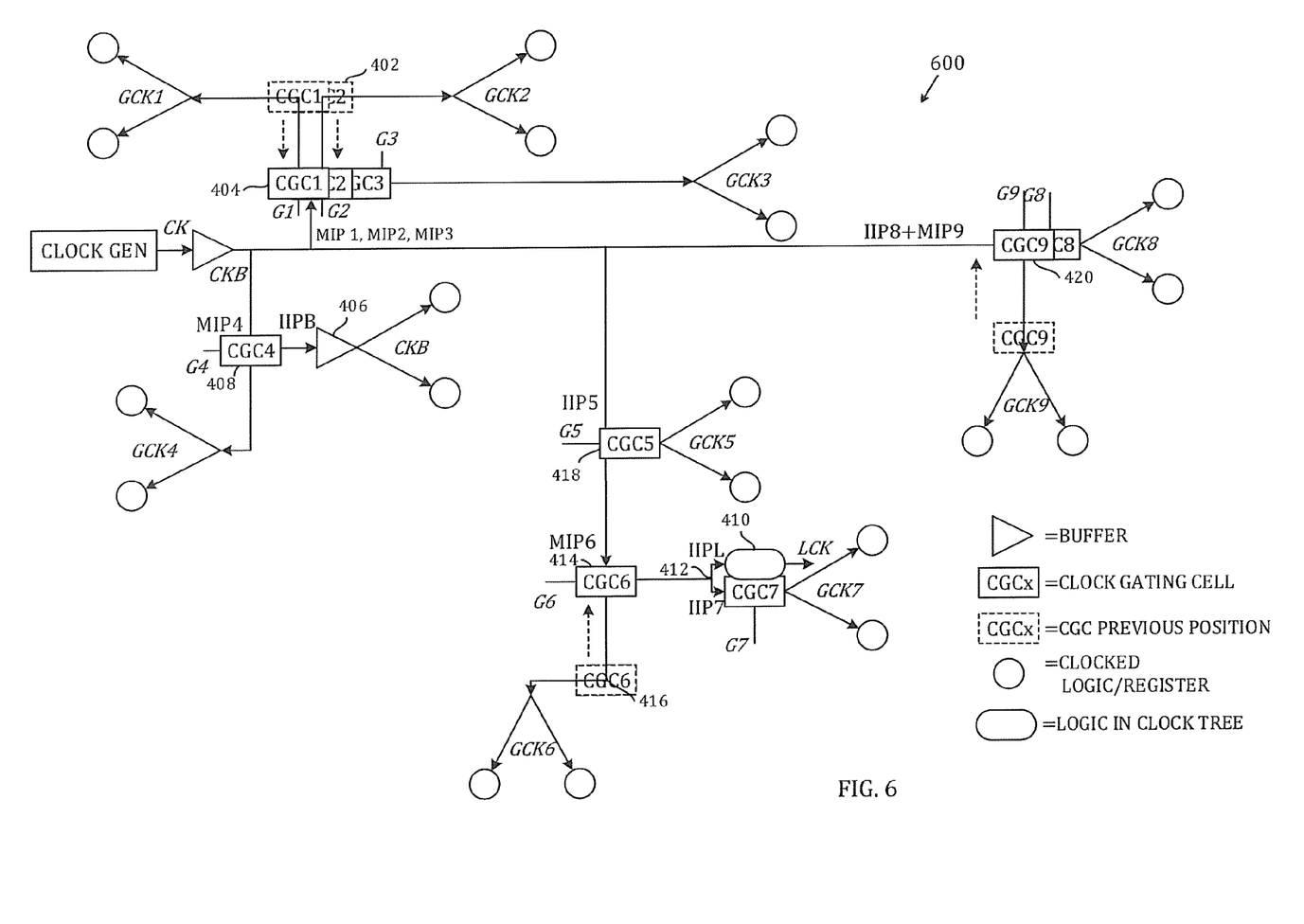
Figure 7:
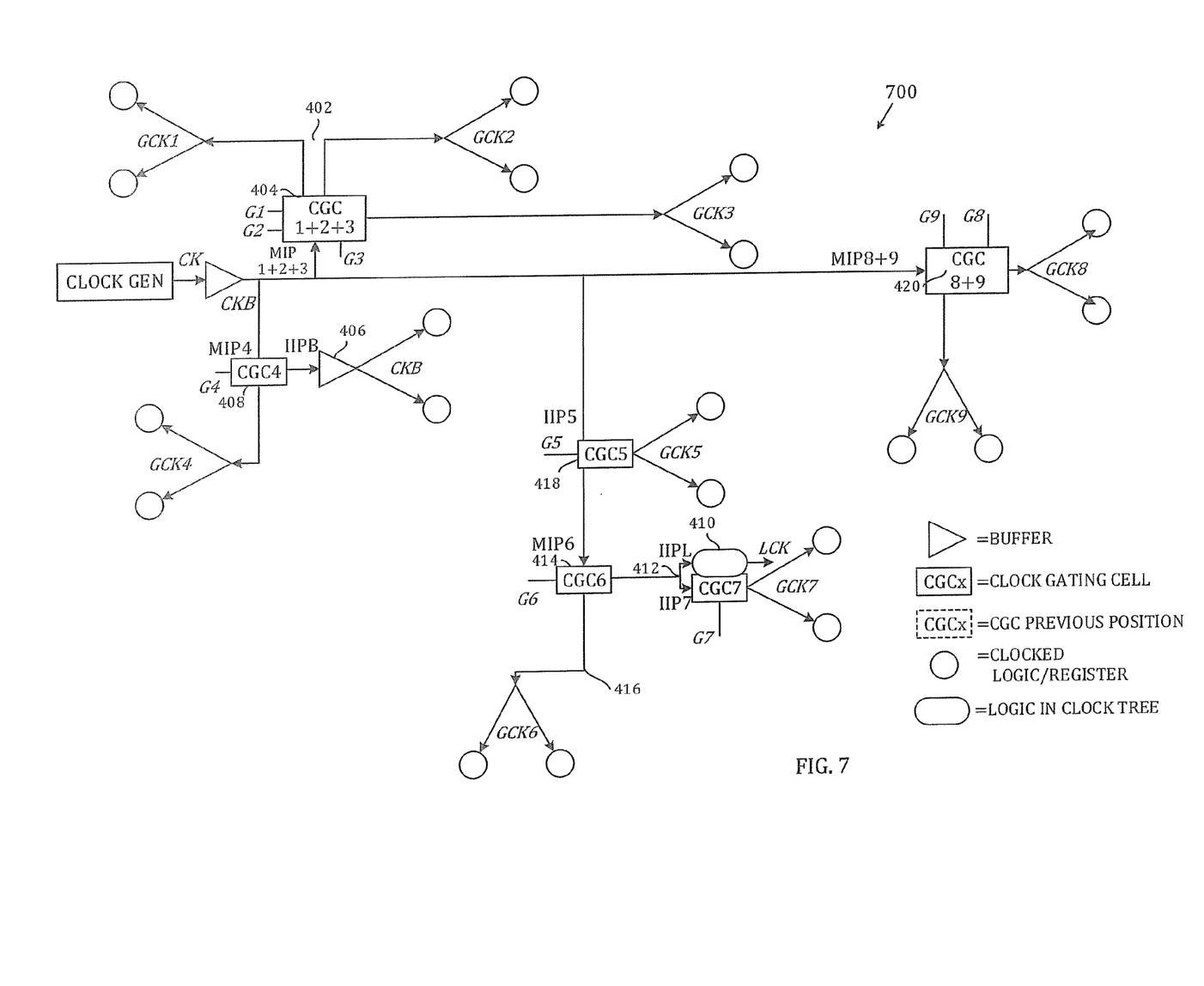
Figure 8:
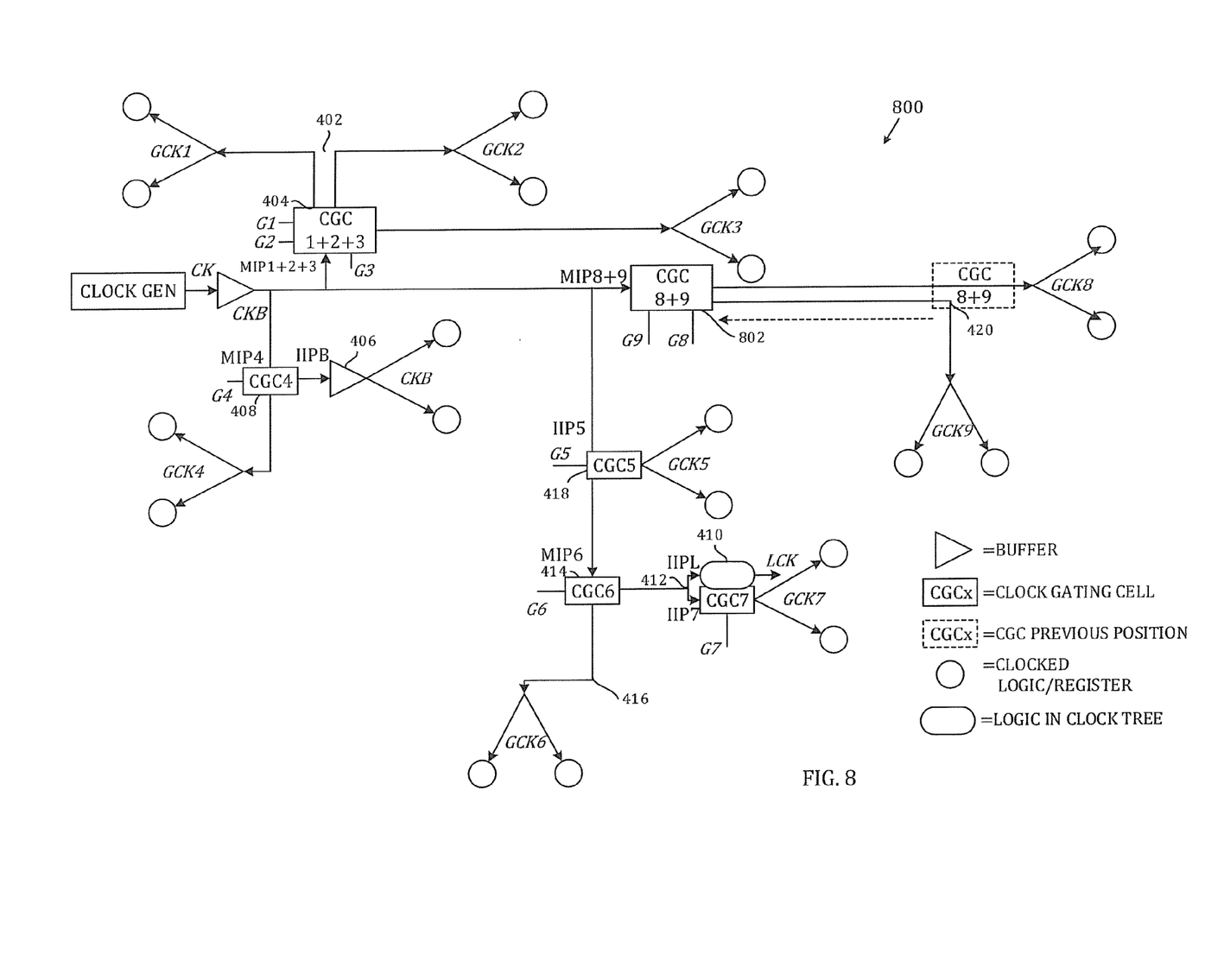

In the method 300, the clock tree 118 initially includes a plurality of clock gating cells CGC1 to CGC9 (FIG. 4) controlled by clock gating signals G1 to G9. The clock gating cells selectively interrupt the distribution of the clock signal CKB through the clock gating cells to respective portions of the IC. The method 300 comprises at 324 defining initial positions of the clock gating cells CGC1 to CGC9 with respective initial clock input paths IIP1 to IIP9 and gated clock outputs (gated clock output signals GCK1 to GCK9). Then at 326 and 328 selected clock gating cells CGC1 to CGC4, CGC6 and CGC9 are moved from the initial positions to modified positions in which at least two clock gating cells are adjoining (CGC1 and CGC2, CGC8 and CGC9 as illustrated in FIG. 5, and CGC1, CGC2 and CGC3 as illustrated in FIG. 6). At 326 and 330 adjoining clock gating cells are merged. Merging 326 and 330 includes substituting for adjoining clock gating cells (as shown in FIG. 6 at CGC1, CGC2, CGC3, and at CGC8, CGC9, and in FIG. 10 at 1000 and 1002) a multi-bit clock gating cell (CGC1+2+3 and CGC8+9 in FIG. 7, 1004 in FIG. 10) having a clock input path (MIP1+2+3 and MIP8+9 in FIG. 7, MIP1+2 in FIG. 10), a plurality of gating signal inputs receiving the respective clock gating signals G1, G2, G3, G8 and G9 and a plurality of the corresponding gated clock outputs GCK1, GCK2, GCK3, and GCK8, GCK9 that the respective clock gating signals control. An iteration may include moving together adjoining clock gating cells such as CGC1, CGC2 before merging them (FIG. 6) or may include moving multi-bit clock gating cells such as CGC8+9 after merging them (FIG. 8). A capacitance of the modified clock input path (MIP1+2+3, MIP8+9 in FIGS. 7 and 8, MIP1+2 in FIG. 10) of the resulting multi-bit clock gating cell (CGC1+2+3, CGC8+9, 1004) is less than an aggregate capacitance of the initial clock input paths (IIP1+IIP2+IIP3, IIP8+IIP9 in FIG. 4, IIP8+MIP9 in FIG. 6; IIP1+IIP2 in FIG. 10) of the corresponding clock gating cells (CGC1, CGC2 and CGC3, and CGC8 and CGC9, 1000 and 1002 FIG. 10) before moving and merging.

Figure 9:
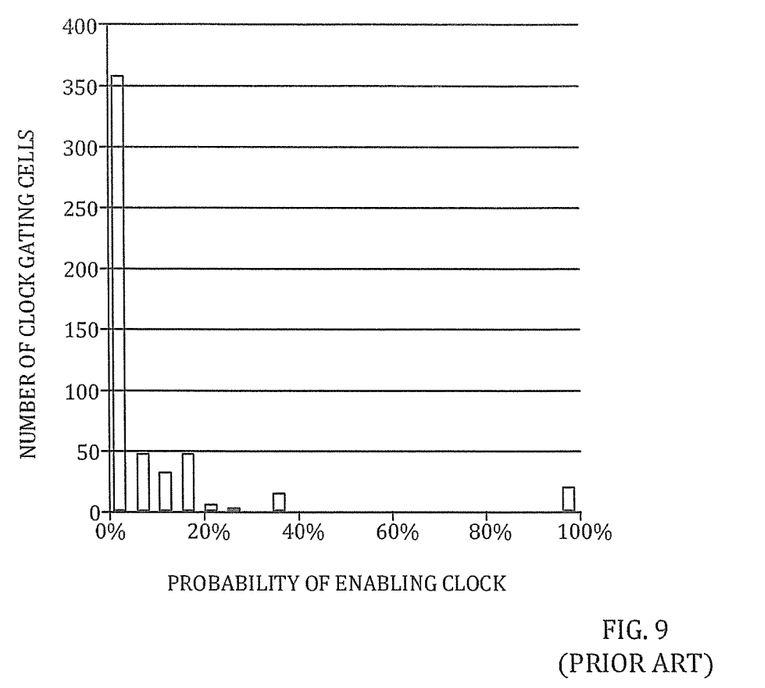
FIG. 9 is a graph of a typical statistical distribution of the number of clock gating cells against their probability of being enabled at a given time in an IC such as the IC of FIG. 1.

A reduction of the capacitance of the clock input paths, the upstream capacitance, is provided by the use of a common clock input path, such as MIP1+2+3 for the multi-bit clock gating cell CGC1+2+3, instead of a plurality of initial clock input paths IIP1, IIP2 and IIP3 for the clock gating cells CGC1, CGC2 and CGC3. In addition, the length of the common clock input path, such as MIP1+2+3, may be shorter than one or more of the initial clock input paths IIP1, IIP2 and IIP3. Reduction of the upstream capacitance of the clock input paths provides a reduction of the dynamic power consumption of the clock tree 118. Even if there is a consequent increase in the downstream capacitance of the clock output paths to the elements of the IC to which the clock gating cells distribute the clock signals, the downstream capacitance only consumes dynamic power when the clock gating cells distribute the gated clock signal GCLKx. While the clock gating cells interrupt the clock signal GCLKx, the downstream capacitance does not consume dynamic power, so that the net effect is usually a net reduction in effective dynamic power consumption of the clock input and output paths. As illustrated by FIG. 9, which is a graph of a typical statistical distribution of the probability of clock gating cells enabling the distribution of the clock, the vast majority of clock gating cells enable distribution of the clock less than 5% of the time, and lengthening the downstream clock path penalizes correspondingly little the downstream power consumption. In addition, the merging of the adjoining clock gating cells into a multi-bit clock gating cell gives additional opportunities for reduction in dynamic power consumption inside the clock gating cells. In an embodiment of the invention, taking account of the reduction of the upstream capacitance and any reduction of the capacitance of the multi-bit clock gating cell itself resulting from any merging, the increase in downstream capacitance weighted by the statistical activation of the downstream path is more than compensated. In cases of an aggressive move, where there is a doubt as to its viability, the reduction of power consumption can be checked.

In the method 300, moving 326 selected clock gating cells may comprise moving clock gating cells along initial clock input paths; this can achieve a simplification of the design process by avoiding reiterating the initial routing process, which modifying the routing of clock input paths would involve. Moving 326 selected clock gating cells may comprise moving at least one single-output clock gating cell CGC1 to CGC4, CGC6, CGC8 and CGC9. The moves (and merges) 326 of single-output clock gating cells may be considered a safety move with a high confidence of acceptability. The selected clock gating cells may be moved as a group (CGC1 and CGC2 in FIG. 6) or individually (CGC1 to CGC4, CGC6 and CGC9 in FIGS. 5 and 6). Safety actions can be undertaken at least semi-automatically, depending on the topography of the initial positions of the clock gating cells.

The movement of selected clock gating cells may be limited by critical points, the critical points being selected from a group comprising at least one of an inflection point, a cross point, an overlap point, an in-line point, and a maximum displacement point, as defined herein. A clock gating cell situated at an end point is considered suitable for a safety move, unless the end point is also an overlap point. The initial or modified position may correspond to more than one of the definitions of the group and the group is not limited to the critical points referred to. As used herein, these expressions refer to:

an inflection point to a point where the clock input path changes direction;

an in-line point to a point where another clock tree or logic cell is already situated overlapping the clock input path;

a cross point to a point where two or more clock input paths converge or diverge;

an overlap point to a point where two clock tree elements, one of whose positions is already fixed by the routing process, are very close or overlapping;

a maximum displacement point to a modified position situated at a maximum displacement along the clock input path from the initial position; the maximum displacement may be settable by the designer to a suitable value, for example a chosen number of routing tracks; and an end-point to a position at the end of a clock input path.

Examples of critical points are illustrated in the drawings. In FIG. 4 an example of an inflection point is node 416; examples of cross points are nodes 402, 404, 408, 414; an example of an overlap point is node 412; examples of in-line points are nodes 418 and 420. In FIG. 5, node 404 becomes an in-line point. In FIG. 8, node 802 is a maximum displacement point.

Safety actions may not represent the maximum power reduction that can be obtained. The method 300 may comprise moving 328 at least one multi-bit clock gating cell CGC8+9, which may be considered an aggressive move, which is likely, but not certain, to save power consumption and whose acceptability should be checked. The method 300 may comprise a plurality of iterations of moving 328 selected clock gating cells, and at least a selected iteration includes moving a multi-bit clock gating cell CGC8+9, wherein the selected iteration is retained 330 if design criteria 332 are satisfactory, and wherein a result of a previous iteration is reverted to 334 if the design criteria are unsatisfactory. In another embodiment of the invention (not shown), a selected iteration includes merging 330 selected adjoining clock gating cells CGC8 and CGC9, moving 328 the resulting multi-bit clock gating cell CGC8+9, and verifying the design criteria 332 after the aggressive move, the merge and move being retained unless at 334 the design criteria are unsatisfactory.

Verifying the design criteria represents a complication of the physical design process, which the opportunity of a larger power reduction may or may not justify. Accordingly, a decision is taken at 336 whether power reduction is critical and, if not, the moves and merges 328, 330 are omitted and the method 300 ends at 338.

Figure 10:
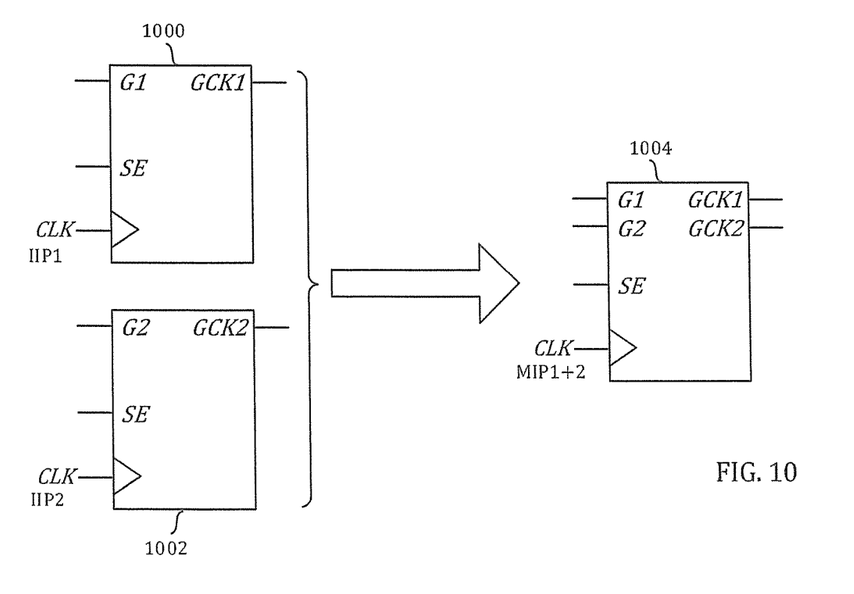
FIG. 10 is a schematic block diagram of an example of merging two clock gating cells in accordance with an embodiment of the invention.

The design criteria at 332 may be selected from a group including at least one of:

a minimal reduction in the power consumption of a section of the clock tree involving the resulting multi-bit clock gating cell CGC1+2+3, CGC8+9, 1004;

acceptability of routing congestion of the full design 100 involving the resulting multi-bit clock gating cell CGC1+2+3, CGC8+9, 1004;

sufficiency of drivability of gated clock signal outputs of the resulting multi-bit clock gating cell CGC1+2+3, CGC8+9, 1004 acceptability of timing slack of the corresponding clock gating cell itself (between the clock signal CKB input and the clock enable signal SE) and the gated clock output paths of the resulting multi-bit clock gating cell CGC1+2+3, CGC8+9, 1004.

Figure 11:
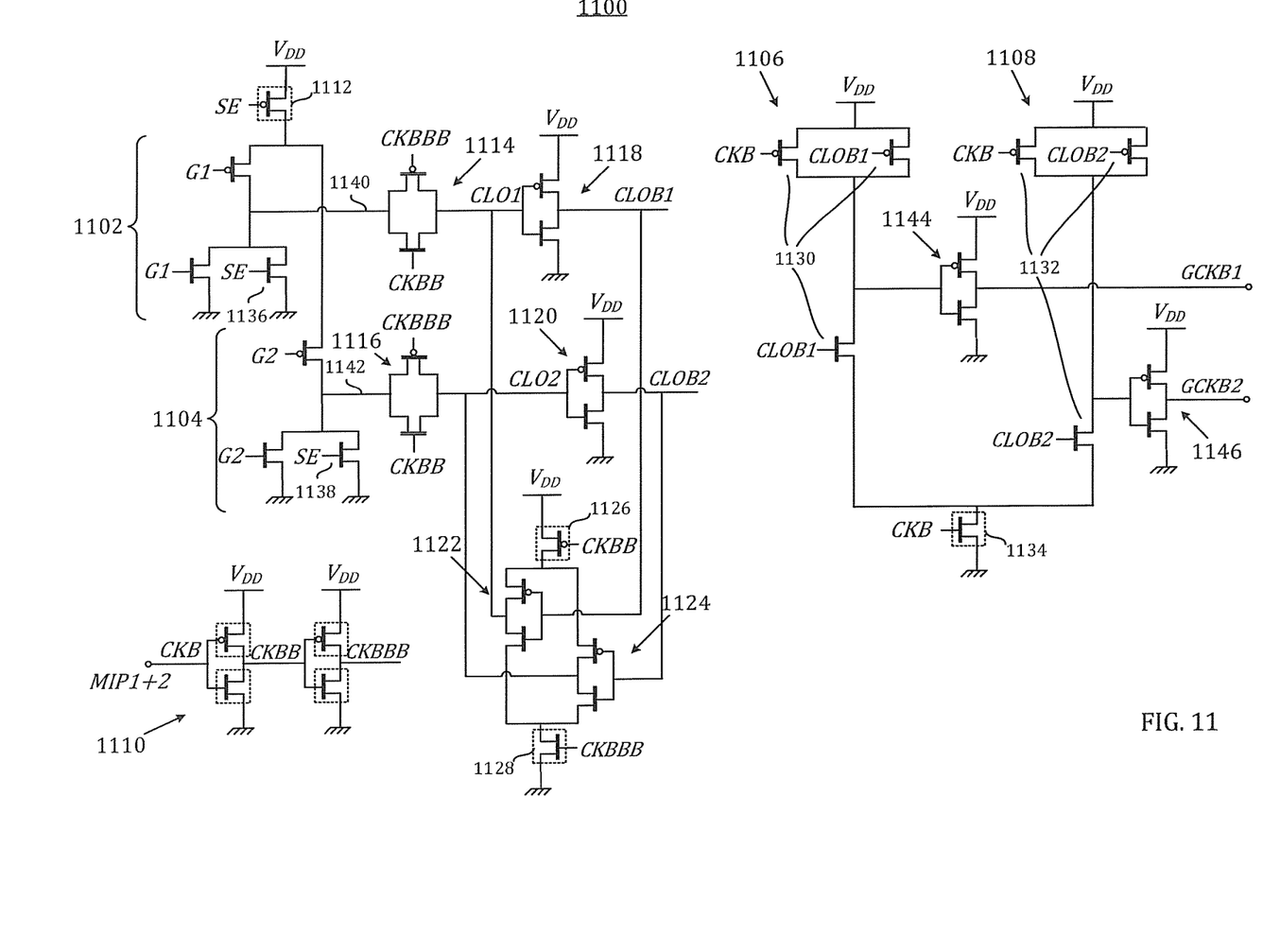
FIG. 11 is a schematic circuit diagram of a clock gating cell after merging in accordance with an embodiment of the invention.

As illustrated in FIG. 11 at 1100, the multi-bit clock gating cell 1100 may have a plurality of gating signal paths G1, CLO1, CLOB1; G2, CLO2, CLOB2 coupled between respective gating signal inputs 1102, 1104 and the corresponding gated clock outputs 1106, 1108, wherein the gating signal paths control the gated clock signals GCKB1, GCKB2 at the respective gated clock outputs 1106, 1108. The multi-bit clock gating cell 1100 may have at least one clock buffer 1110 that receives a clock signal CKB and is common to the gating signal paths G1, CLO1, CLOB1; G2, CLO2, CLOB2.

In accordance with an embodiment of the invention, the method 300 of physical design of an IC such as the IC 100 including a clock tree 118 distributing an input clock signal CKB to elements of the IC, has successive iterations. Each iteration comprises defining initial positions of clock gating cells CGC1 to CGC9 with respective initial clock input paths IIP1 to IIP9 and initial gated clock output paths (signals GCK1 to GCK9). At 326 and 328 selected clock gating cells CGC1 to CGC4, CGC6 and CGC9 are moved from the initial positions along the corresponding clock input paths IIPx to modified positions with respective modified clock input paths MIPx and modified gated clock output paths. The movement along the corresponding clock input paths IIPx is limited by critical points, the critical points being selected from a group including at least one of an inflection point, a cross point, an overlap point, an in-line point, and a maximum displacement point, as defined herein. Capacitances of the modified clock input paths MIPx are less than corresponding capacitances of the initial clock input paths IIPx.

In the method 300, for at least selected iterations the modified positions of at least two clock gating cells (CGC1 and CGC2, CGC8 and CGC9) may be adjoining, and adjoining clock gating cells may be merged 326 and 330. Merging 326 and 330 includes substituting for adjoining clock gating cells (as shown in FIG. 6 at CGC1, CGC2, CGC3, and at CGC8, CGC9, and in FIG. 10 at 1000 and 1002) a multi-bit clock gating cell (CGC1+2+3 and CGC8+9 in FIG. 7, 1004 in FIG. 10) having a clock input path (MIP1+2+3 and MIP8+9 in FIG. 7, MIP1+2 in FIG. 10), a plurality of gating signal inputs receiving the respective clock gating signals G1, G2, G3, and G8, G9 and a plurality of the corresponding modified gated clock output paths that the respective clock gating signals G1, G2, G3, and G8, G9 control. A capacitance of the modified clock input path (MIP1+2+3, MIP8+9, MIP1+2) of the resulting multi-bit clock gating cell is less than an aggregate capacitance of the initial clock input paths (IIP1+IIP2+IIP3; IIP8+IIP9; IIP1+IIP2) of the corresponding clock gating cells (CGC1, CGC2 and CGC3, CGC8 and CGC9, FIG. 4, 1000 and 1002 FIG. 10) before moving and merging.

An embodiment of the invention includes a non-transitory computer-readable storage medium storing instructions for an EDA tool such as 200 that includes a processor 202 and a memory 204, 206 coupled to the processor, which when the instructions are executed cause the EDA tool to perform the method 300 of physical design of an IC.

In accordance with an embodiment of the invention, an integrated circuit (IC), such as 100, has a clock tree 118 distributing a clock signal CLK to elements of the IC and including a multi-bit clock gating cell (CGC1+2+3, CGC8+9 FIG. 7, 1004 FIG. 10) illustrated in FIGS. 8 and 11 at 1004 and 1100. The multi-bit clock gating cell 1004, 1100 comprises:

a clock input path (MIP1+2);

a plurality of gating signal inputs 1102, 1104 receiving respective clock gating signals G1, G2;

a plurality of corresponding gated clock outputs 1106, 1108 controlled by the respective clock gating signals G1, G2; and a plurality of gating signal paths G1, CLO1, CLOB1; G2, CLO2, CLOB2 coupled between respective gating signal inputs 1102, 1104 and the corresponding gated clock outputs 1106, 1108, The gating signal paths G1, CLO1, CLOB1; G2, CLO2, CLOB2 control the gated clock signals GCKB1, GCKB2 at the gated clock outputs 1106, 1108 to interrupt selectively the distribution of the clock signal CKB through the multi-bit clock gating cell 1004, 1100 to respective portions of the IC.

The input clock signal CKB may be common to the gating signal paths G1, CLO1, CLOB1; G2, CLO2, CLOB2, which enables a reduction of the capacitance that the multi-bit clock gating cell 1004, 1100 itself presents to the input clock signal CKB compared to the separate clock gating cells 1002 and 1004, giving a further reduction of power in addition to the reduction of the upstream capacitance of the clock input paths.

The multi-bit clock gating cell 1100 may have at least one clock buffer 1110 that receives a clock signal CKB and is common to the gating signal paths G1, CLO1, CLOB1; G2, CLO2, CLOB2.

The multi-bit clock gating cell 1100 may have a scan enable input receiving a scan enable signal SE that when asserted overrides the control of the gated clock outputs 1106, 1108 by the respective clock gating signals GCKB1, GCKB2. The multi-bit clock gating cell 1100 may have a plurality of input gates 1102, 1104 in respective gating signal paths G1, CLO1, CLOB1; G2, CLO2, CLOB2, wherein the input gates 1102, 1104 receive the scan enable signal SE and the respective clock gating signals G1, G2, and have at least one common element 1112 controlled by the scan enable signal SE. The input gates 1102, 1104 may perform a logic NOR function on the scan enable signal and the respective clock gating signals.

The gating signal paths G1, CLO1, CLOB1; G2, CLO2, CLOB2 may comprise: (i) respective switches 1114, 1116 blocking control of the gated clock outputs 1106, 1108 by the clock gating signals G1, G2 during a phase of the input clock signal CKB; (ii) respective gating signal buffers 1118, 1120; and (iii) respective positive feedback paths 1122, 1124 maintaining the outputs of the gating signal buffers 1118, 1120 during the phases when the switches 1114, 1116 block control of the gated clock outputs 1106, 1108 by the clock gating signals. The positive feedback paths 1122, 1124 include common elements 1126, 1128 controlled by the clock signal CKB.

The gated clock outputs 1106, 1108 may have a plurality of output gates 1130, 1132 controlling the gated clock signals GCKB1, GCKB2 at the respective gated clock outputs, and wherein the output gates have at least one common element 1134 controlled by the clock signal.

The use of elements common to the different gating signal paths instead of separate elements for respective gating signal paths, which are always clocked, provides a reduction of the dynamic power consumption of the clock tree 118, as well as saving chip area.

In more detail, FIGS. 4 to 8 illustrate a simplified example of moves and merges 326 and 328, 330. It will be appreciated that the IC will typically involve moving and merging far more clock gating cells, than the nine illustrated for simplicity. FIG. 4 shows an example of a situation 400 with the initial single-output clock gating cells CGC1 to CGC9 in their initial positions, which are all end-points, with respective individual initial clock input paths IIP1 to IIP9. FIG. 5 shows a first iteration 500 in the clock tree synthesis process, in which selected clock gating cells CGC1 to CGC4, CGC6 and CGC9 are moved 326 and 328 from the initial positions (shown in FIG. 5 in dashed lines) to modified positions (in full lines), the moves being emphasized by dashed arrows. In this example, the clock gating cells CGC1 and CGC2 are moved to modified positions in which they are adjoining at a common inflection point 402, which is also a cross point. The clock gating cell CGC3 is moved to a modified position, which is a cross point 404 in the situation 400 illustrated in FIG. 4 and then becomes an in-line point for the subsequent iteration 500.

The clock tree 118 includes a buffer 406 having a clock input path IIPB and that supplies a buffered clock to logic elements outside the clock tree 118. The position of the buffer 406 and its clock input path IIPB are defined by the place and routing process in the clock tree synthesis, and cannot be changed without re-iterating the clock tree synthesis process at least partially. The clock input path IIP4 of the clock gating cell CGC4 overlaps the clock input path IIPB of the buffer 406 until the overlap point 408, which constitutes a critical point limiting movement of the clock gating cell CGC4 to reduce further the capacitance of the input path MIP4, as illustrated in FIG. 5.

The clock tree 118 includes logic elements 410 that are provided for design purposes, such as 'AND', 'OR' gates and 'multiplexer' (mux) cells, and clock tree synthesis purposes, such as 'buffer' or 'inverter' cells. The logic elements 410 have a clock input path IIPL and the position of the logic elements 410 and their clock input path IIPL also cannot be changed without re-iterating the clock tree synthesis process at least partially. The clock input path IIP7 of the clock gating cell CGC7 overlaps the clock input path IIPL of the logic elements 410 until the overlap point 412, which constitutes a critical point preventing reduction of capacitance of the clock input path IIP7 by movement of the clock gating cell CGC7. The clock input path IIP6 of the clock gating cell CGC6 overlaps the clock input path IIPL of the logic elements 410 until the cross point 414, but which does not prevent the clock gating cell CGC6 being moved to the inflection point 416, which is a critical point limiting movement of the clock gating cell CGC6 during the first iteration. The clock gating cell CGC5 is at an in-line point 418, where its clock input path IIP5 overlaps the clock input paths IIPL of the logic elements and MIP6 of the clock gating cell CGC6, preventing movement of the clock gating cell CGC5 reducing the capacitance of the clock input paths. The clock gating cell CGC9 is moved to a modified position, which is an in-line point, as well as being an inflection point and a cross point 420, where it is adjoining the clock gating cell CGC8.

FIG. 6 illustrates a further iteration 600 in the clock tree synthesis 300. In the iteration 600, the clock gating cells CGC1 and CGC2 are moved together to the in-line point 404, adjoining the clock gating cell CGC3. It will be appreciated that the clock gating cells CGC1 and CGC2 could be merged in the iteration 600 before being moved to the in-line point 404, but in this example it is simpler to move them together before merging since they will both be merged with the clock gating cell CGC3 subsequently. This move constitutes an aggressive move that is then verified 332 and 334 for compliance with the design criteria. The clock gating cell CGC6 is moved to the cross point 414, where its clock input path MIP6 overlaps the clock input path IIPL and prevents further movement of the clock gating cell CGC6 reducing the capacitance of the clock input paths. The clock gating cells CGC4, CGC5 and CGC7 cannot be moved further since they are already at in-line points 408, 418 and the overlap point 414. The clock gating cells CGC8 and CGC9 could optionally be moved together in this iteration 600 but are left in place in this example.

FIG. 7 illustrates a further iteration 700 in the clock tree synthesis 300, in which the clock gating cells CGC1, CGC2 and CGC3 are merged to form a multi-bit clock gating cell CGC1+2+3 with a modified common clock input path MIP1+2+3, and the clock gating cells CGC8 and CGC9 are merged to form a multi-bit clock gating cell CGC8+9 with a modified clock input path MIP8+9.

FIG. 8 illustrates a further iteration 800 in the clock tree synthesis 300, in which the multi-bit clock gating cell CGC8+9 is moved to the modified position 802, which is a critical point situated at a maximum displacement, set by the designer, along the clock input path MIP8+9 from the initial position in iteration 700. The move of the multi-bit clock gating cell CGC8+9 constitutes an aggressive move that is then verified 332 and 334 for compliance with the design criteria.

The following is an example of an algorithm that can be used in performing verification 332 and 334 of an aggressive move 328 and merge 330:

```
while (1)
    flag← 0
    for each "clock gate cell" do
        if <it is an end point> and <not an overlap point
        > and <not an in-line point> then
            if < distance between "clock gate cell" and
            "nearest critical point * along this clock
            routing path" <= [max step**] > then
                "clock gate cell" moves to the "nearest
                critical point" along "clock routing path"
            else then
                "clock gate cell" moves [max step] toward to
                the "nearest critical point" "along clock
                routing path"
            end if
            if <power ok> and <routing ok> and <driving
            ok> and <CG timing ok> then
                incr flag
```

-continued

```
        else then
            return "clock gate cell" to its original
            location
            end if
        end for
        merge all adjoining "clock gate cells" into "multi-
        output clock gate cell"
        if <flag> 0> then
            continue
        else then
            break
        end if
    end while
```

*In this algorithm, nearest critical point means nearest "inflection point", "cross point" or "in-line point".
**Max step can be defined by designer, for example 20 tracks or 2 rows, or another distance.

An example of the power reduction criterion is given by the equation:

$$\frac{(fC_LV^2 - (g_1fC_LV^2 + g_2fC_LV^2))}{fC_LV^2} \geq 10\%.$$

In other words, the modified power consumption ($g_1fC_LV^2 + g_2fC_LV^2$) must be less than the aggregate initial power consumption $fC_LV^2$ before merging where f is the clock frequency, g is a factor representing the proportion of the time that the capacitance of the modified input and output paths are charged, $C_L$ is the capacitance of the path or line, and V is the clock voltage.

An example of the criterion whether routing congestion is acceptable is whether the routing channel (gcell) overflow is under control.

An example of the criterion whether the drive current of the gated clock signal outputs (drivability) of the resulting multi-bit clock gating cell is sufficient is whether the increase of transition time Δt for a clock transition t at the outputs of the merged clock gating cell is less than t*20%, this figure being at the choice of the designer.

An example of the criterion whether the timing slack of gated clock signal outputs of the merged multi-bit clock gating cell is acceptable is whether the timing slack $t_s$ of the gated clock output signal is positive $t_s>0$.

FIG. 11 illustrates an example of the multi-bit clock gating cell 1100 in the technology known as complementary-metal-oxide-semiconductor (CMOS), having pairs of field-effect transistors (FETs) of opposite type. As is well known, the gate of an FET is not necessarily metal but may have another conductive material, such as polysilicon, and the oxide may be replaced at least partially by other electrical insulators, such as a nitride, for example.

The multi-bit clock gating cell 1100 is illustrated in FIG. 11 for the case of the cell 1004. The cell 1100 has two gating signal input gates 1102, 1104 receiving respective clock gating signals G1, G2 in the example illustrated but it will be appreciated that more than two gating signal inputs may be provided, for example three gating signal inputs. The gating signal paths G1, CLO1, CLOB1; G2, CLO2, CLOB2 are coupled between respective gating signal input gates 1102, 1104 and the corresponding gated clock outputs 1106, 1108. Elements that are common to the different gating signal paths, avoiding duplication of these elements, are identified by a dotted rectangular envelope.

The clock input signal CKB is received through the clock input path MIP1+2 at the clock buffer 1110 that has two successive inverter stages each having a complementary pair of MOSFETs, the first inverter stage providing an inverted clock signal CKBB and the second inverter stage providing a doubly inverted clock signal CKBB. The buffered clock signals CKBB and CKBB are supplied internally in the cell 1100 in common to the gating signal paths G1, CLO1, CLOB1; G2, CLO2, CLOB2, avoiding duplication of the buffer.

In each of the input gates 1102, 1104, the gating signals G1 or G2 is received on the gates of a respective complementary pair of MOSFETs whose source-drain paths are connected in series. A respective n-type MOSFET 1136, 1138 receives the scan enable signal SE on its gate and has its source-drain path connected in parallel with the source-drain path of the n-type MOSFET of the corresponding complementary pair of MOSFETs. The outputs 1140, 1142 of the input gates 1102, 1104 are at the nodes connecting the source-drain paths of the respective complementary pairs of MOSFETs. A p-type MOSFET 1112 has its source-drain path connected in series between the voltage supply VDD and the source-drain paths of both the complementary pairs of MOSFETs in common to the gating signal paths G1, CLO1, CLOB1; G2, CLO2, CLOB2, and its gate receives the scan enable signal SE.

The input gates 1102, 1104 are NOR gates. In operation, when the scan enable signal SE is high (asserted) the common p-type MOSFET 1112 is OFF and the n-type MOSFETs 1136, 1138 are ON, pulling the outputs 1140, 1142 down to ground. Also, when the gating signals G1 or G2 are high (asserted) the n-type MOSFETs of the complementary pairs of MOSFETs are ON, pulling the outputs 1140, 1142 down to ground. Assertion of the scan enable signal SE overrides the control of the gated clock outputs 1106, 1108 by both the clock gating signals GCKB1, GCKB2 and makes the clock gating cell 1100 inoperative to interrupt the output clock signals GCKB1 and GCKB2, for the purposes of internal test for example. The signals on the outputs 1140, 1142 are inverted relative to the clock gating signals G1, G2 when the scan enable signal SE is low (de-asserted).

The outputs 1140, 1142 of the input gates 1102, 1104 are connected to respective switches 1114, 1116. Each of the switches 1114, 1116 has a respective pair of complementary MOSFETs whose source-drain paths are connected in parallel. The gate of the n-type MOSFET of each pair receives the inverted clock signal CKBB and the gate of the p-type MOSFET of each pair receives the doubly inverted clock signal CKBBB. In operation, during the clock phase when the input clock signal CKB is high both MOSFETs of each pair in the switches 1114, 1116 are OFF, blocking control of the gated clock outputs 1106, 1108 by the input gates 1102, 1104. During the clock phase when the input clock signal CKB is low both MOSFETs of each pair in the switches 1114, 1116 are ON, and the signals CLO1, CLO2 at the outputs of the switches 1114, 1116 follow the inverted gating signals at the outputs 1140, 1142 of the input gates, passing control through to the gated clock outputs 1106, 1108. The switches and following loop structure are used as a latch function: when CKB is low, the latch is transparent and accepts a new gate signal value, when CKB is high, the switches are off and the latch keeps the value of the previous period.

The output signals CLO1, CLO2 are driven by the feedback logic 1122, 1124 during the clock phase when the input clock signal CKB is high. The output signals CLO1, CLO2 are input to respective latches; to stabilize the signals during this clock phase. The latches have respective gating signal buffers 1118, 1120, and respective positive feedback paths 1122, 1124 maintaining the outputs of the gating signal buffers 1118, 1120 during the clock phases while the switches 1114, 1116 are OFF. Each of the gating signal buffers 1118, 1120 has a pair of complementary MOSFETs whose gates receive as input the signals CLO1, CLO2 and whose source-drain paths are connected in series forming an inverter. The output signals CLOB1, CLOB2 from the inverters 1118, 1120 are input to respective inverters in the positive feedback paths 1122 and 1124 whose outputs are connected to the inputs of the gating signal buffers 1118, 1120. The positive feedback paths 1122, 1124 are only operational during the clock phases while the switches 1114, 1116 are OFF and do not interfere with the gating signals during the opposite clock phase. For this purpose, in the positive feedback paths 1122 and 1124 a p-type MOSFET 1126 is connected between the voltage supply $V_{DD}$ and the parallel connections of the source-drain paths of the inverters. Similarly an n-type MOSFET 1128 is connected between ground and the parallel connections of the source-drain paths of the inverters. The gates of the MOSFETs 1126 and 1128 receive the inverted clock signal CKBB and the doubly inverted clock signal CKBBB respectively and the MOSFETs 1126 and 1128 are only conductive during the clock phases while the switches 1114, 1116 are OFF. The MOSFETs 1126 and 1128 are common to the positive feedback paths 1122 and 1124, avoiding duplication.

Each of the output gates 1130, 1132 has two p-type MOSFETs whose source-drain paths are connected in parallel between the voltage supply $V_{DD}$ and the drain of a respective n-type MOSFET, whose source is connected to ground through the source-drain path of an n-type MOSFET 1134, while the outputs of the output gates 1130, 1132 are taken from the node connecting the drain of the n-type MOSFET and the drains of the p-type MOSFETs. The gate of the MOSFET 1134 receives the input clock signal CKB, and the MOSFET 1134 is common to the output gates 1130, 1132, avoiding duplication. The gated clock signals GCKB1, GCKB2 are taken from the outputs of the gates 1130, 1132 through respective buffers 1144, 1146, formed by inverters.

In operation, while the signal CLOB1, CLOB2 is high, the gates 1130, 1132 pass the input clock signal CKB, inverted, and the inverters of the buffers 1144, 1146 re-establish the clock phase of the gated clock signals GCKB1, GCKB2. While the signal CLOB1, CLOB2 is low, the gates 1130, 1132 hold their outputs high and the inverters of the buffers 1144, 1146 hold the gated clock signals GCKB1, GCKB2 down at ground, interrupting the distribution of the clock signals at that gated clock signal output.

In the foregoing specification, the invention has been described with reference to specific examples of embodiments of the invention. It will, however, be evident that various modifications and changes may be made therein without departing from the broader spirit and scope of the invention as set forth in the appended claims.

For example, the IC described herein can include a semiconductor substrate having any semiconductor material or combinations of materials, such as gallium arsenide, silicon germanium, silicon-on-insulator (SOI), silicon, monocrystalline silicon, the like, and combinations of the above.

The connections as discussed herein may be any type of connection suitable to transfer signals from or to the respective nodes, units or devices, for example via intermediate devices. Accordingly, unless implied or stated otherwise, the connections may be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The terms "assert" or "set" and "negate" (or "de-assert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. Similarly, any arrangement of components to achieve the same functionality is effectively "associated" such that the desired functionality is achieved. Hence, any two components combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples of an IC, or portions thereof, may be implemented as soft or code representations of physical circuitry or of logical representations convertible into physical circuitry, such as in a hardware description language of any appropriate type.

In the claims, the word 'comprising' or 'having' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit (IC) having a clock tree that distributes a clock signal to elements of the IC and including a multi-bit clock gating cell, the multi-bit clock gating cell comprising:
    a clock input path;
    a plurality of gating signal inputs that receive respective clock gating signals;
    a corresponding plurality of gated clock outputs, controlled by the respective clock gating signals, and that provide respective gated clock signals; and
    a plurality of gating signal paths coupled between respective gating signal inputs and the corresponding gated clock outputs,
    wherein the gating signal paths control the gated clock signals at the gated clock outputs to interrupt selectively the distribution of the clock signal to the elements of the IC, and wherein the gating signal paths comprise:
    respective switches blocking control of the gated clock outputs by the clock gating signals during a phase of the input clock signal;
    respective gating signal buffers; and
    respective positive feedback paths maintaining outputs of the gating signal buffers during the phases when the switches block control of the gated clock outputs by the clock gating signals,
    wherein the positive feedback paths include common elements controlled by the clock signal.

2. The IC of claim 1, wherein the multi-bit clock gating cell has at least one clock buffer that receives the clock signal and is common to the gating signal paths.

3. The IC of claim 1, wherein the multi-bit clock gating cell has a scan enable input that receives a scan enable signal, wherein when the scan enable signal is asserted, control of the gated clock outputs by the respective clock gating signals is overridden.

4. The IC of claim 3, wherein the multi-bit clock gating cell has a plurality of input gates in respective gating signal paths, and wherein the input gates receive the scan enable signal and the respective clock gating signals, and have at least one common element controlled by the scan enable signal.

5. The IC of claim 4, wherein the input gates perform a logic NOR function on the scan enable signal and the respective clock gating signals.

6. The IC of claim 1, wherein the gated clock outputs have a plurality of output gates controlling the gated clock signals at the respective gated clock outputs, wherein the output gates have at least one common element controlled by the clock signal.

* * * * *